(12) United States Patent
Zhang et al.

(10) Patent No.: US 11,999,060 B2
(45) Date of Patent: Jun. 4, 2024

(54) ACTION LEARNING METHOD, MEDIUM, AND ELECTRONIC DEVICE

(71) Applicant: CloudMinds Robotics Co., Ltd., Shanghai (CN)

(72) Inventors: ZhanChao Zhang, Shanghai (CN); Xiao-Qing William Huang, Shanghai (CN)

(73) Assignee: CLOUDMINDS ROBOTICS CO., LTD., Shanghai (CN)

(*) Notice: Subject to any disclaimer, the term of this patent is extended or adjusted under 35 U.S.C. 154(b) by 302 days.

(21) Appl. No.: 17/566,211

(22) Filed: Dec. 30, 2021

(65) Prior Publication Data

US 2022/0203523 A1 Jun. 30, 2022

Related U.S. Application Data

(63) Continuation of application No. PCT/CN2021/094432, filed on May 18, 2021.

(30) Foreign Application Priority Data

Dec. 28, 2020 (CN) .......................... 202011582786.4

(51) Int. Cl.
*B25J 9/16* (2006.01)
*G06T 7/246* (2017.01)
(Continued)

(52) U.S. Cl.
CPC .............. *B25J 9/163* (2013.01); *G06T 7/246* (2017.01); *G06T 7/70* (2017.01); *G06V 10/761* (2022.01);
(Continued)

(58) Field of Classification Search
CPC ......... B25J 9/163; B25J 9/1664; G06T 7/246; G06T 7/248; G06T 7/251;
(Continued)

(56) References Cited

U.S. PATENT DOCUMENTS

2002/0049530 A1 4/2002 Poropat
2011/0210915 A1* 9/2011 Shotton ................ G06V 40/103
345/157

(Continued)

FOREIGN PATENT DOCUMENTS

CN 101075351 11/2007
CN 101187990 A 5/2008
(Continued)

OTHER PUBLICATIONS

Chinese Second Office Action for Application No. 202011582786.4, (12 pages).
(Continued)

*Primary Examiner* — Jason Holloway
*Assistant Examiner* — Benjamin J Brosh
(74) *Attorney, Agent, or Firm* — NIXON PEABODY LLP

(57) ABSTRACT

An action learning method, including: acquiring human body moving image data; determining three-dimensional human body pose action data corresponding to the human body moving image data; matching the three-dimensional human body pose action data with atomic actions in a robot atomic action library to determine robot action sequence data corresponding to the human body moving image data; performing action continuity stitching on all robot sub-actions in the robot action sequence data sequentially; determining a continuous action learned by a robot from the robot action sequence data subjected to the action continuity stitching.

15 Claims, 6 Drawing Sheets

(51) Int. Cl.
  *G06T 7/70*     (2017.01)
  *G06V 10/74*    (2022.01)
(52) U.S. Cl.
  CPC ............... *G06T 2207/20081* (2013.01); *G06T 2207/30196* (2013.01)
(58) Field of Classification Search
  CPC .......... G06T 2207/20081; G06T 2207/30196; G06V 10/761; G06V 10/74; G06V 10/757; G06V 40/23; G06V 40/20; G05B 2219/40; G05B 2219/40392
  See application file for complete search history.

(56) References Cited

U.S. PATENT DOCUMENTS

| | | | |
|---|---|---|---|
| 2014/0121501 A1 | 5/2014 | Fichtinger et al. | |
| 2016/0288323 A1 | 10/2016 | Muhlig et al. | |
| 2019/0094979 A1* | 3/2019 | Hall | G06F 3/0346 |
| 2020/0398420 A1* | 12/2020 | Nagano | B25J 13/06 |
| 2021/0046648 A1* | 2/2021 | Schmitt | B25J 9/1687 |
| 2021/0316449 A1* | 10/2021 | Wang | B25J 9/1664 |
| 2021/0370506 A1* | 12/2021 | Yamane | B25J 9/1658 |
| 2022/0072377 A1* | 3/2022 | Russell | G06V 10/25 |
| 2022/0080581 A1* | 3/2022 | Wang | G06T 7/13 |
| 2022/0203517 A1* | 6/2022 | Iwahara | G06V 10/82 |

FOREIGN PATENT DOCUMENTS

| | | |
|---|---|---|
| CN | 101692284   | 4/2010 |
| CN | 106078752 A | 11/2016 |
| CN | 106131493   | 11/2016 |
| CN | 108098780 A | 1/2018 |
| CN | 108858188   | 11/2018 |
| CN | 110825368 A | 2/2020 |
| CN | 110967992   | 4/2020 |
| CN | 111860243   | 10/2020 |

OTHER PUBLICATIONS

Chinese Office Action for Application No. 202011582786.4, mailed Jul. 25, 2022, (22 pages).

* cited by examiner

ACTION LEARNING METHOD, MEDIUM, AND ELECTRONIC DEVICE

CROSS-REFERENCE TO RELATED APPLICATIONS

The present application is a continuation application filed under 35 U. S. C. § 111, claiming benefit under 35 U. S. C. § 120 of its parent PCT International application No. PCT/CN2021/094432 filed on May 18, 2021, which, in turn, claims benefit of priority of CN Patent Application No.: 202011582786.4, filed Dec. 28, 2020, the entire contents of each of which are incorporated herein by reference.

BACKGROUND

Among the current solutions for controlling action of a robot, a commonly used solution is to directly control actions of a robot based on an action catcher, specifically, a human body is required to wear several action catcher devices (including but not limited to an inertial measurement unit (IMU)) that are connected to one computing device, and then be connected to the body of the robot through the computing device to form a local network, the actions of the human body are captured through the action catcher, the robot is synchronously controlled to make similar actions, and the moving angles and velocities of joints of the human body and corresponding joints of the body of the robot are basically kept approximate or controlled within a certain error range. Alternatively, another solution is a method based on robot trajectory planning, in which kinematics and dynamics algorithm-based motion trajectory planning needs to be performed on the moving position, velocity and acceleration of each joint in a robot coordinate system, each joint moves according to the planned trajectory, and a plurality of joints are linked to form the action of the robot.

SUMMARY

In a first aspect, the disclosure provides an action learning method, including:
  acquiring human body moving image data;
  determining three-dimensional human body pose action data corresponding to the human body moving image data, the three-dimensional human body pose action data including a plurality of three-dimensional human body poses arranged in the chronological order of actions;
  matching the three-dimensional human body pose action data with atomic actions in a robot atomic action library to determine robot action sequence data corresponding to the human body moving image data, the robot action sequence data including a plurality of robot sub-actions including the atomic actions and/or mapped actions obtained by mapping the three-dimensional human body pose action data;
  performing action continuity stitching on all robot sub-actions in the robot action sequence data sequentially; and
  determining a continuous action learned by a robot from the robot action sequence data subjected to the action continuity stitching.

In a second aspect, the disclosure provides an electronic device, including:
  a memory, storing a computer program; and
  a processor configured to execute the computer program in the memory to implement the steps of the method described above.

In a third aspect, the disclosure provides a non-temporary computer-readable storage medium storing a computer program which, when executed by a processor, implements the steps of the method described above.

BRIEF DESCRIPTION OF THE DRAWINGS

The accompanying drawings are intended to provide a further understanding of the disclosure, form a part of the description, and are used to explain the disclosure together with the following specific examples, but do not constitute a limitation of the disclosure. In the drawings.

DETAILED DESCRIPTION

The specific examples of the disclosure will be described in detail in conjunction with the accompanying drawings. It should be understood that the specific examples described herein are for the purpose of illustrating and explaining the disclosure only and are not intended to limit the disclosure.

Figure 1:
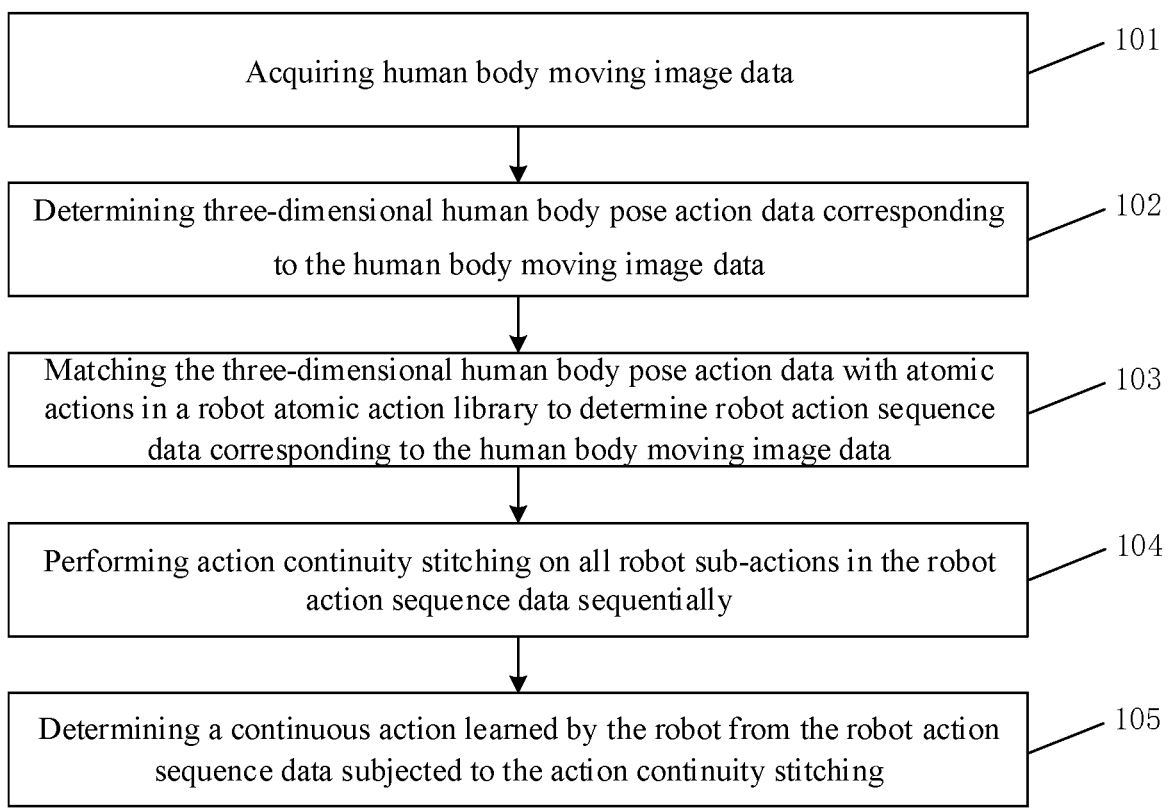
FIG. 1 is a flowchart of an action learning method according to an exemplary example of the disclosure.

FIG. 1 is a flowchart of an action learning method according to an exemplary example of the disclosure. As shown in FIG. 1, the method includes steps 101-105.

Step 101, acquiring human body moving image data. The human body moving image data is 2D image data and can be acquired by any image capture device, such as an RGB camera. The image capture device may be a device arranged on a robot or may be any external device.

Step 102, determining three-dimensional human body pose action data corresponding to the human body moving image data. The three-dimensional human body pose action data includes a plurality of three-dimensional human body poses arranged in the chronological order of actions.

Figure 2:
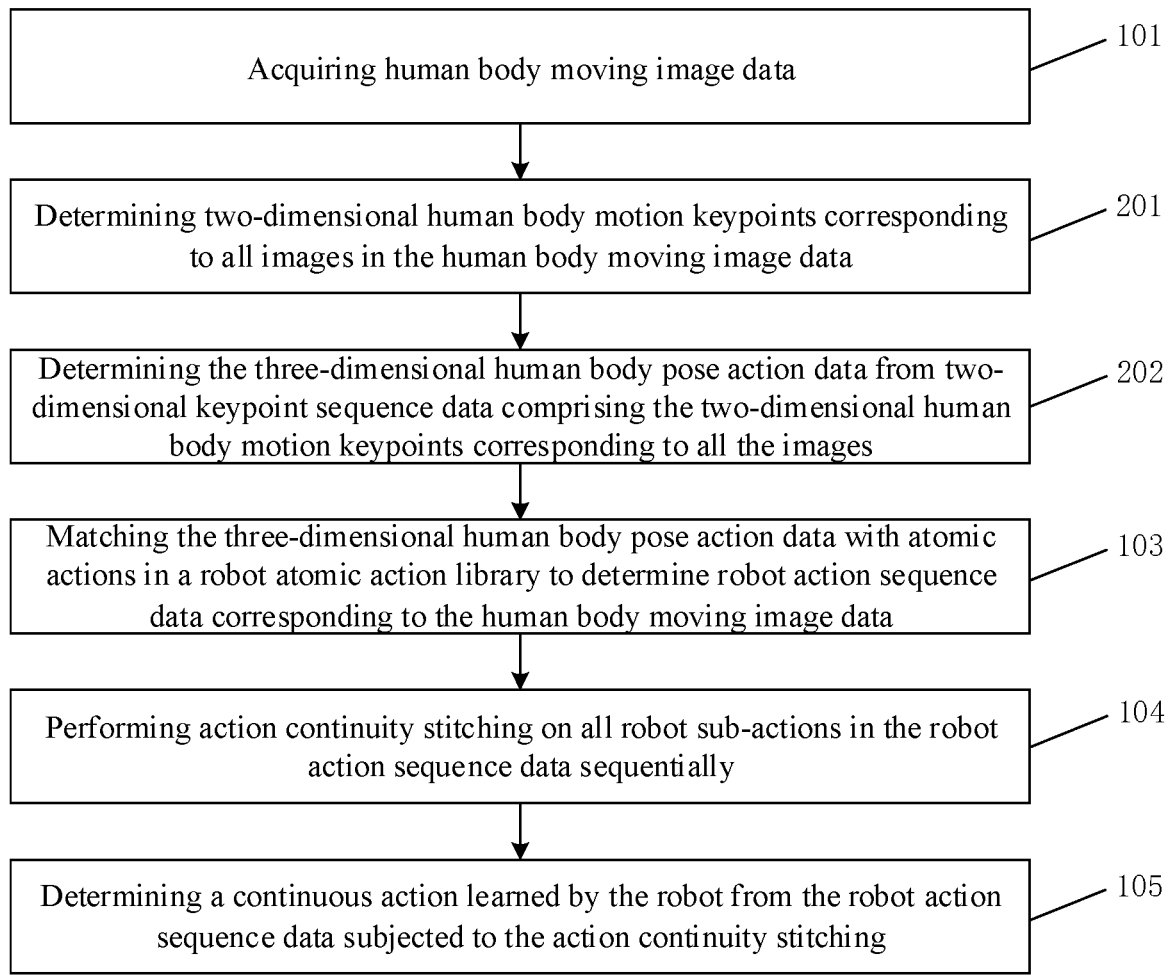
FIG. 2 is a flowchart of an action learning method according to another exemplary example of the disclosure.

A method of determining three-dimensional human body pose action data corresponding to the human body moving image data may be as shown in FIG. 2, and includes steps 201 and 202.

Step 201, determining two-dimensional human body motion keypoints corresponding to all images in the human body moving image data. Step 202, determining the three-dimensional human body pose action data from two-dimensional keypoint sequence data including the two-dimensional human body motion keypoints corresponding to all the images. There may be a variety of methods for detecting human body motion keypoints in each image in the 2D human body moving image data, such as the MSPN (multi-stage pose estimation network)-based human body pose estimation method, the HRNet (High-Resolution Representations network)-based human body pose estimation method, the Hourglass network-based human body pose estimation method. After two-dimensional human body motion keypoints in each frame of images are obtained, a sequence of human body motion keypoints can be obtained in the time dimension. By accumulating the motion of the two-dimensional human body motion keypoints in time, the three-dimensional motion pose of the corresponding human body action can be estimated, thus obtaining the three-dimensional human body pose action data. Specifically, the estimation can be done by means such as a fully convolutional model, i.e. through a model for performing temporal dilated convolution on two-dimensional keypoints to obtain 3D poses.

Step 103, matching the three-dimensional human body pose action data with atomic actions in a robot atomic action library to determine robot action sequence data corresponding to the human body moving image data. The robot action sequence data includes a plurality of robot sub-actions, and the robot sub-actions include the atomic actions and/or mapped actions obtained by mapping the three-dimensional human body pose action data.

The robot atomic action library is a database comprising action data files (including motion trajectories of joints of the robot and corresponding timestamps) that can be directly executed by the robot and obtained by the robot through preset methods (e.g. pre-implanting or pre-learning), and each action data file refers to one atomic action. Each atomic action in the robot atomic action library can no longer be subdivided, and meanwhile a self-collision or non-human action situation does not arise when atomic actions are executed on the corresponding robot body.

That is, the three-dimensional human body pose action data can be matched to one or more atomic actions in the robot atomic action library, to form the robot action sequence data, alternatively, under the condition that there is partial action data in the three-dimensional human body pose action data that cannot be matched to a corresponding atomic action, the partial three-dimensional human body pose action data may be directly mapped into joint action data of the robot as the mapped actions, which serve as robot sub-actions included in the robot action sequence data together with other matched atomic actions.

In a possible implementation, under the condition that no action data in the three-dimensional human body pose action data is matched to an atomic action, the robot action sequence data can be directly formed by the mapped actions obtained by mapping. In a possible implementation, all action data in the three-dimensional human body pose action data are matched to corresponding atomic actions, all robot sub-actions included in the robot action sequence data are atomic actions in the atomic action library.

Additionally, an atomic action included in the robot action sequence data and the three-dimensional human body pose action data matched thereto may or may not be equal in action duration, that is, three-dimensional human body pose action data corresponding to human body moving image data with two seconds can be matched to an atomic action with an action duration of three seconds as long as the matching degree of the atomic action and the three-dimensional human body pose action data meets a predetermined matching condition.

Step 104, performing action continuity stitching on all robot sub-actions in the robot action sequence data sequentially. The action continuity stitching may include smooth optimization of robot pose positions and robot motion velocities at junctions between adjacent robot sub-actions, and/or avoidance processing of self-collision anomalies occurring in robot action sequence data obtained by sequential stitching of robot sub-actions. That is, smooth optimization needs to be performed between the robot state at the end of the preceding sub-action and the robot state at the beginning of the succeeding sub-action in two adjacent robot sub-actions to make the connection of the two sub-actions smoother. Under the condition that the robot action sequence data has an anomaly problem that affects the safety of the robot, such as self-collision anomaly, it is also necessary to perform avoidance processing on the problem, thereby guaranteeing the safety of the robot.

Step 105, determining a continuous action learned by the robot from the robot action sequence data subjected to the action continuity stitching.

The robot action sequence data subjected to the action continuity stitching may be used as a continuous action learned by the robot to be directly executed on the robot, or saved as a fixed action to be called for execution on demand.

Figure 3:
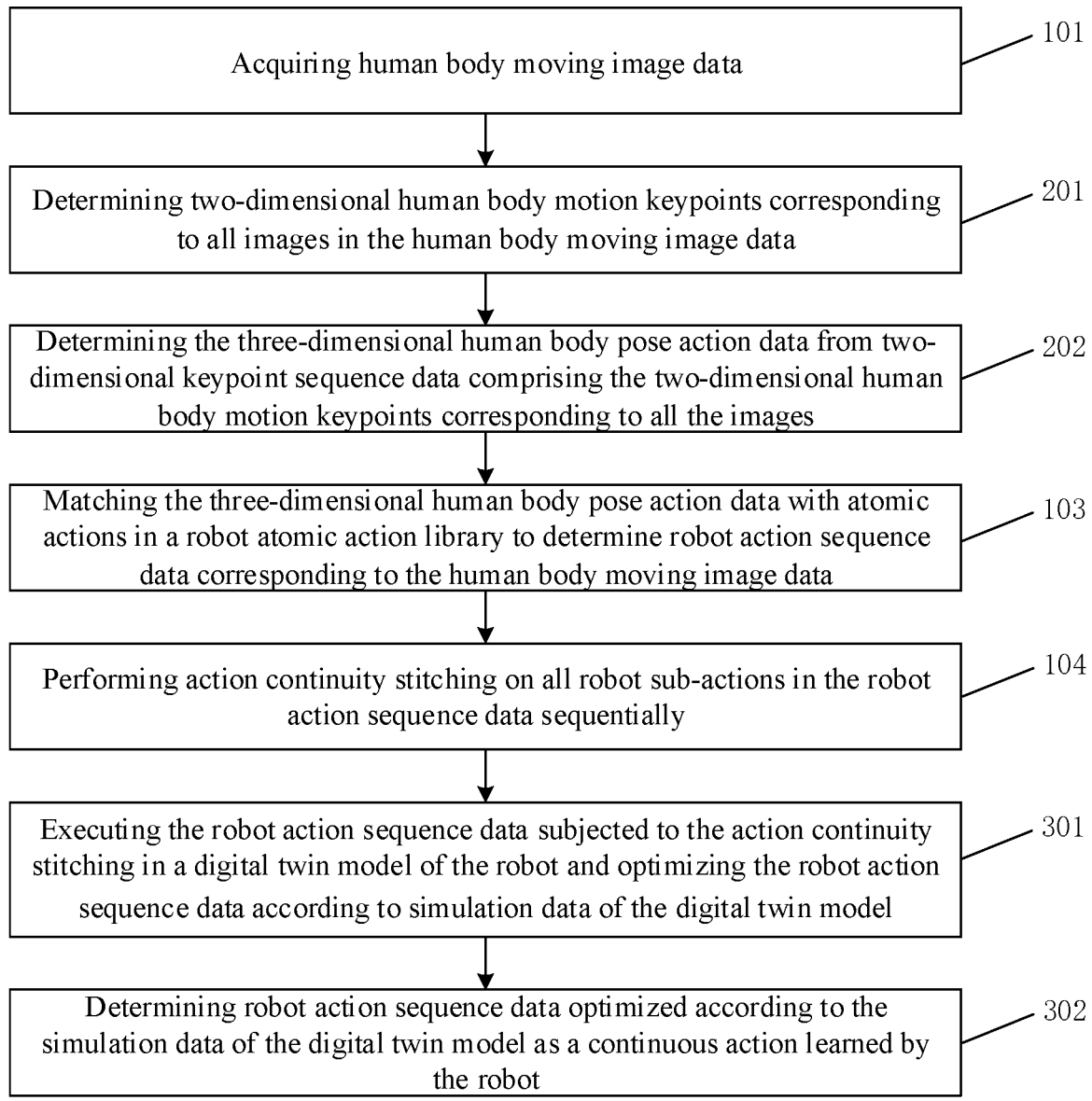
FIG. 3 is a flowchart of an action learning method according to yet another exemplary example of the disclosure.

Alternatively, the robot action sequence data subjected to the action continuity stitching may be subjected to other adjustment such as data optimization and data correction, and then the robot action sequence data subjected to adjustment may be determined as the continuous action learned by the robot. The specific manner of adjustment is not limited in the disclosure, and an exemplary adjustment method is given in FIG. 3, as shown in FIG. 3, the method includes steps 301 and 302.

Step 301, executing the robot action sequence data subjected to the action continuity stitching in a digital twin model of the robot and optimizing the robot action sequence data according to simulation data of the digital twin model.

Step 302, determining robot action sequence data optimized according to the simulation data of the digital twin model as a continuous action learned by the robot.

The digital twin model is a digital twin agent that is the same as the physical robot built inside a virtual mirror world, may be, for example, a geometric model of Mesh, and may also be a digital model obtained by simulating the physical properties of the robot. Content of simulation includes but is not limited to: joint motor simulation, sensing simulation (lidar, depth camera, binocular stereo camera, etc.), self-gravity, collision, material damping. The behavioral actions of the digital twin model can be implemented through methods such as feedback control implementation, environment awareness and state acquisition, virtuality and reality synchronization, etc.

Whether the robot action sequence data needs to be optimized can be determined through manners such as simulated observation, self-collision detection, or abnormal action judgment conducted by the digital twin model, and performing corresponding optimization on the data that needs to be optimized, either automatically or by receiving manual correcting instructions. Finally, the robot action sequence data optimized according to the simulation data of the digital twin model can be determined as a continuous action learned by the robot.

With the above technical solution, robot action sequence data corresponding to the human body moving image data can be obtained by matching in the robot atomic action library through 2D human body moving image data without action catcher or planning the robot trajectories, and actions in the robot action sequence data can be smoothly connected and optimized, so that smooth robot actions can be quickly and accurately learned.

Figure 4:
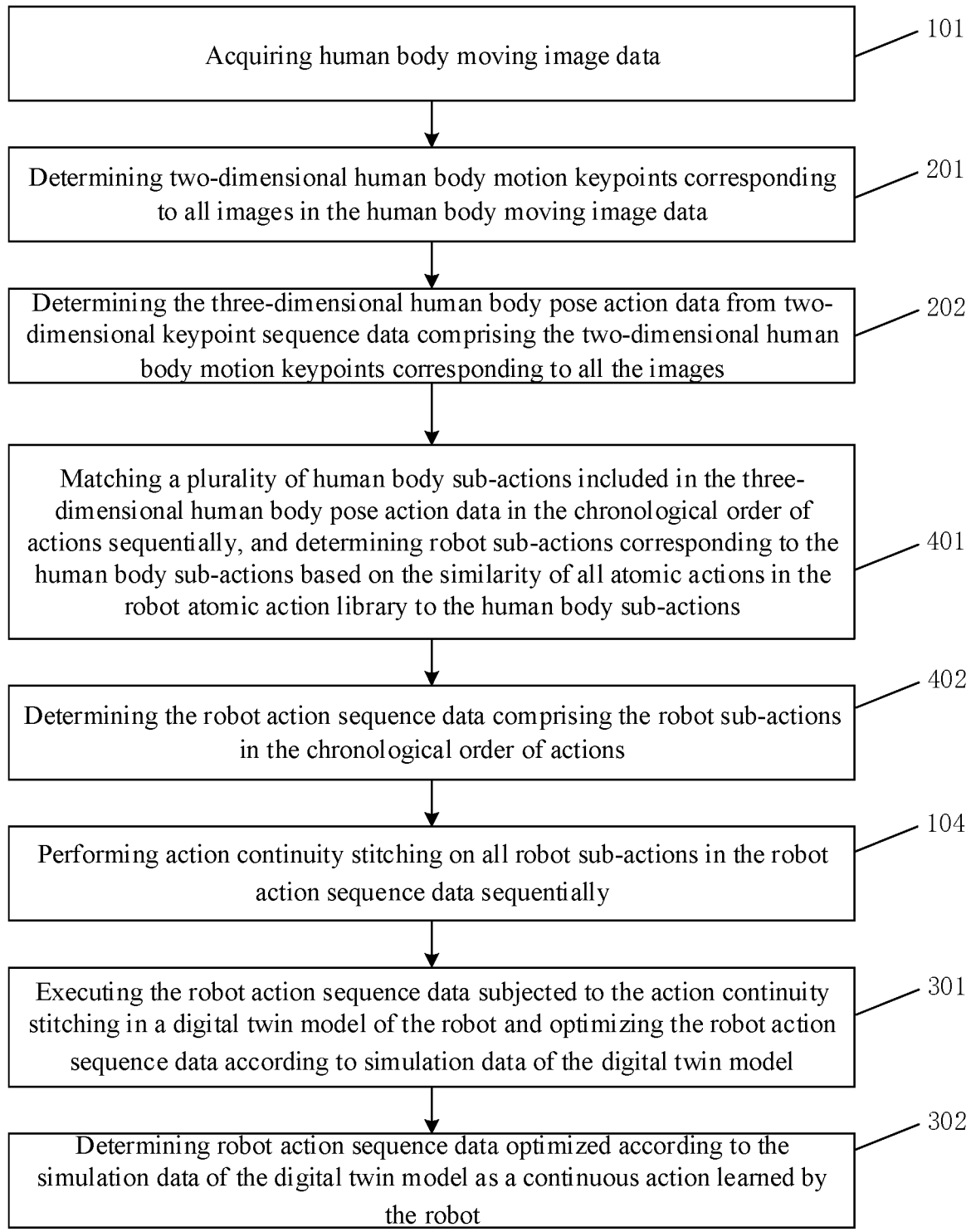
FIG. 4 is a flowchart of an action learning method according to yet another exemplary example of the disclosure.

FIG. 4 is a flowchart of an action learning method according to yet another exemplary example of the disclosure. As shown in FIG. 4, the method further includes steps 401 and 402.

Step 401, matching a plurality of human body sub-actions included in the three-dimensional human body pose action data in the chronological order of actions sequentially, and determining robot sub-actions corresponding to the human body sub-actions based on the similarity of all atomic actions in the robot atomic action library to the human body sub-actions. The human body sub-action comprises one or more of the three-dimensional human body poses.

Step 402, determining the robot action sequence data formed by the robot sub-actions in the chronological order of actions.

The human body sub-action is a portion of three-dimensional human body pose action data of varying duration. The three-dimensional human body pose action data may be formed of all human body sub-actions arranged in the chronological order of actions. The division method of the human body sub-actions may be determined according to the actual matching case, for example, if the first two seconds of three-dimensional human body pose action data in the three-dimensional human body pose action data matches to similar atomic actions in the robot atomic action library, then the first two seconds of three-dimensional human body pose action data may be determined as one human body sub-action, and subsequent three-dimensional human body pose action data is added frame by frame from the third second of three-dimensional human body pose action data as the three-dimensional human body pose action data to be matched to continue matching in the atomic action library until the three-dimensional human body pose action data to be matched matches to a similar atomic action in the atomic action library. At this point, the partial three-dimensional human body pose action data currently used for matching may be determined as one human body sub-action. For example, the first 30 frames of the third second of three-dimensional human body pose may be matched in the atomic action library as the three-dimensional human body pose action data to be matched, under the condition that no matching results are generated, the last 30 frames of the third second of three-dimensional human body pose is added to the three-dimensional human body pose action data to be matched (under the condition that one second includes a total of 60 frames of three-dimensional human body poses), and if a similar atomic action is matched at this time, the third second of three-dimensional human body pose action data may be used as one human body sub-action.

A method of determining whether the human body sub-action is matched to a similar atomic action may be judged based on the similarity, for example, when an atomic action with the similarity to the human body sub-action currently to be matched being higher than a similarity threshold in the atomic action library is determined as an atomic action that matches the human body sub-action to be matched, then the atomic action may be used as a robot sub-action corresponding to the human body sub-action.

Methods of determining the similarity may include, but are not limited to, methods of computing the nearest vector Euclidean distance, minimum variance, cosine approximation between two pieces of action data, etc.

Figure 5:
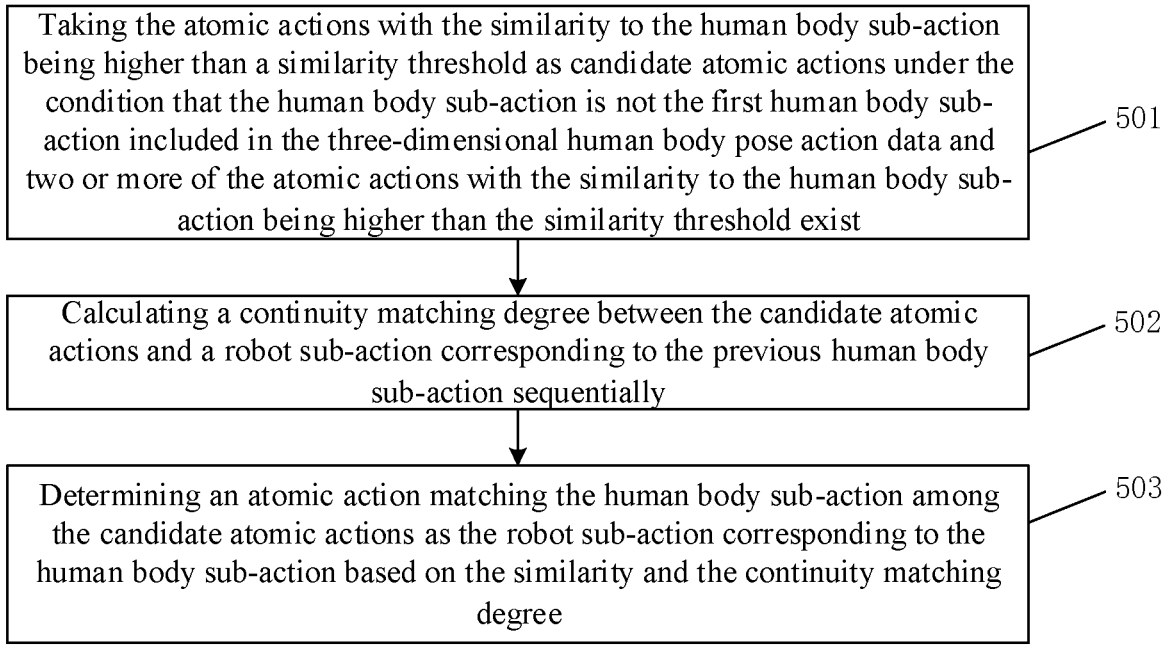
FIG. 5 is a flowchart of a method of determining a robot sub-action corresponding to a human body sub-action based on the similarity of atomic actions to the human body sub-actions in an action learning method according to yet another exemplary example of the disclosure.

If there are multiple atomic actions with the similarity being higher than the similarity threshold, an atomic action with the highest similarity may be selected directly, or an atomic action with better continuity with a robot sub-action corresponding to the previous human body sub-action among atomic actions with the similarity being higher than the similarity threshold is determined as the atomic action that is finally matched by considering continuity of actions. A specific method may be as shown in FIG. 5, and includes steps 501 to 503.

Step 501, taking the atomic actions with the similarity to the human body sub-action being higher than a similarity threshold as candidate atomic actions under the condition that the human body sub-action is not the first human body sub-action included in the three-dimensional human body pose action data and two or more of the atomic actions with the similarity to the human body sub-action being higher than the similarity threshold exist.

Step 502, calculating a continuity matching degree between the candidate atomic actions and a robot sub-action corresponding to the previous human body sub-action sequentially.

Step 503, determining an atomic action matching the human body sub-action among the candidate atomic actions as the robot sub-action corresponding to the human body sub-action based on the similarity and the continuity matching degree.

Methods of determining this continuity matching degree may include, but are not limited to, calculating the distance (including Euclidean distance, variance or cosine distance, etc.) between the candidate atomic action and the robot sub-action corresponding to the previous human body sub-action and the difference of moving velocity between the candidate atomic action and the robot sub-action corresponding to the previous human body sub-action. The weight occupied by the similarity and the continuity matching degree may be set according to actual circumstances.

In addition, if a human body sub-action is the first human body sub-action included in the three-dimensional human body pose action data, the atomic action with the highest similarity may be directly selected as the atomic action that matches the human body sub-action.

In a possible implementation, under the condition that there is no atomic action with the similarity to the human body sub-action being higher than the similarity threshold in the robot atomic action library, the robot sub-action is obtained by mapping the human body sub-action.

For example, matching is performed in the atomic action library from the third second of the three-dimensional human body pose action data, no atomic action with the similarity being higher than the similarity threshold is matched in the atomic action library until the end of the last frame of the three-dimensional human body pose action data, then the three-dimensional human body pose action data after the third second may be directly mapped into joint action data of the robot as the mapping actions and finally as the robot sub-actions to form the robot action sequence data.

Alternatively, in another possible implementation, matching in the atomic action library starts from the third second of the three-dimensional human body pose action data, no atomic action with the similarity being higher than the similarity threshold but with an action duration of only three seconds is matched in the atomic action library until the tenth second, then the third second to the seventh second of three-dimensional human body pose action data may be taken as one human body sub-action and mapped to obtain corresponding robot joint action data and also taken as the robot sub-action.

Since the matched atomic action and the corresponding human body sub-action may be unequal in duration when the matching of the atomic actions is performed, the duration of the robot action sequence data comprising the robot sub-actions may also be unequal to the duration of the three-dimensional human body pose action data.

Figure 6:
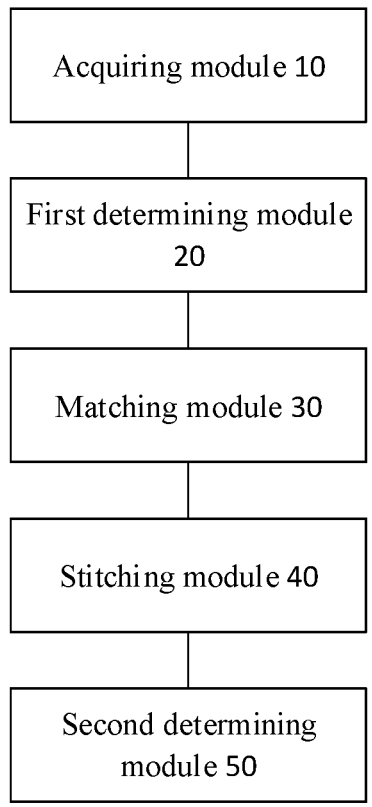
FIG. 6 is a structural block diagram of an action learning apparatus according to an exemplary example of the disclosure.

FIG. 6 is a structural block diagram of an action learning apparatus according to an exemplary example of the disclosure. As shown in FIG. 6, the apparatus includes an acquiring module 10, configured to acquire human body moving image data; a first determining module 20, configured to determine three-dimensional human body pose action data corresponding to the human body moving image data, the three-dimensional human body pose action data including a plurality of three-dimensional human body poses arranged in the chronological order of actions; a matching module 30, configured to match the three-dimensional human body pose action data with atomic actions in a robot atomic action library to determine robot action sequence data corresponding to the human body moving image data, the robot action sequence data comprising a plurality of robot sub-actions including the atomic actions and/or mapped actions obtained by mapping the three-dimensional human body pose action data; a stitching module 40, configured to perform action continuity stitching on all robot sub-actions in the robot action sequence data sequentially; and a second determining module 50, configured to determine a continuous action learned by a robot from the robot action sequence data subjected to the action continuity stitching.

With the above technical solution, robot action sequence data corresponding to the human body moving image data can be obtained by matching in the robot atomic action library through 2D human body moving image data without action catcher or planning the robot trajectories, and actions in the robot action sequence data can be smoothly connected and optimized, so that smooth robot actions can be quickly and accurately learned.

In a possible implementation, the first determining module 20 is further configured to: determine two-dimensional body motion keypoints corresponding to all images in the human body moving image data respectively; and determine the three-dimensional human body pose action data from two-dimensional keypoint sequence data comprising the two-dimensional human body motion keypoints corresponding to the images respectively.

In a possible implementation, the matching module 30 includes: a first sub-module, configured to match a plurality of human body sub-actions included in the three-dimensional human body pose action data sequentially in the chronological order of actions, and determine robot sub-actions corresponding to the human body sub-actions based on the similarity of all atomic actions in the robot atomic action library to the human body sub-actions, the human body sub-action comprising one or more of the three-dimensional human body poses; a second sub-module, configured to determine the robot action sequence data comprising the robot sub-actions in the chronological order of actions.

In a possible example, the first sub-module is further configured to: take the atomic actions with the similarity to the human body sub-action being higher than a similarity threshold as candidate atomic actions under the condition that the human body sub-action is not the first human body sub-action included in the three-dimensional human body pose action data and two or more of the atomic actions with the similarity to the human body sub-action being higher than the similarity threshold exist; calculate a continuity matching degree between the candidate atomic actions and a robot sub-action corresponding to the previous human body sub-action sequentially; determine an atomic action matching the human body sub-action among the candidate atomic actions as the robot sub-action corresponding to the human body sub-action based on the similarity and the continuity matching degree.

In a possible implementation, the first sub-module is further configured to: obtain the robot sub-action by mapping the human body sub-action under the condition that there is no atomic action with the similarity to the human body sub-action being higher than the similarity threshold in the robot atomic action library.

In a possible implementation, the stitching module 40 is further configured to: perform smooth optimization on robot pose positions and robot motion velocities at junctions between adjacent robot sub-actions, and/or avoidance processing on self-collision anomalies occurring in robot action sequence data obtained by sequential stitching of robot sub-actions.

In a possible implementation, the apparatus further includes an optimization module, configured to execute the robot action sequence data subjected to the action continuity stitching in a digital twin model of the robot and optimize the robot action sequence data according to simulation data of the digital twin model; the second determining module 50 is further configured to determine robot action sequence data optimized according to the simulation data of the digital twin model as a continuous action learned by the robot.

With respect to the apparatus in the above described examples, the specific manner in which the various modules perform the operations has been described in detail in relation to the examples of the method, and will not be explained in detail herein.

Figure 7:
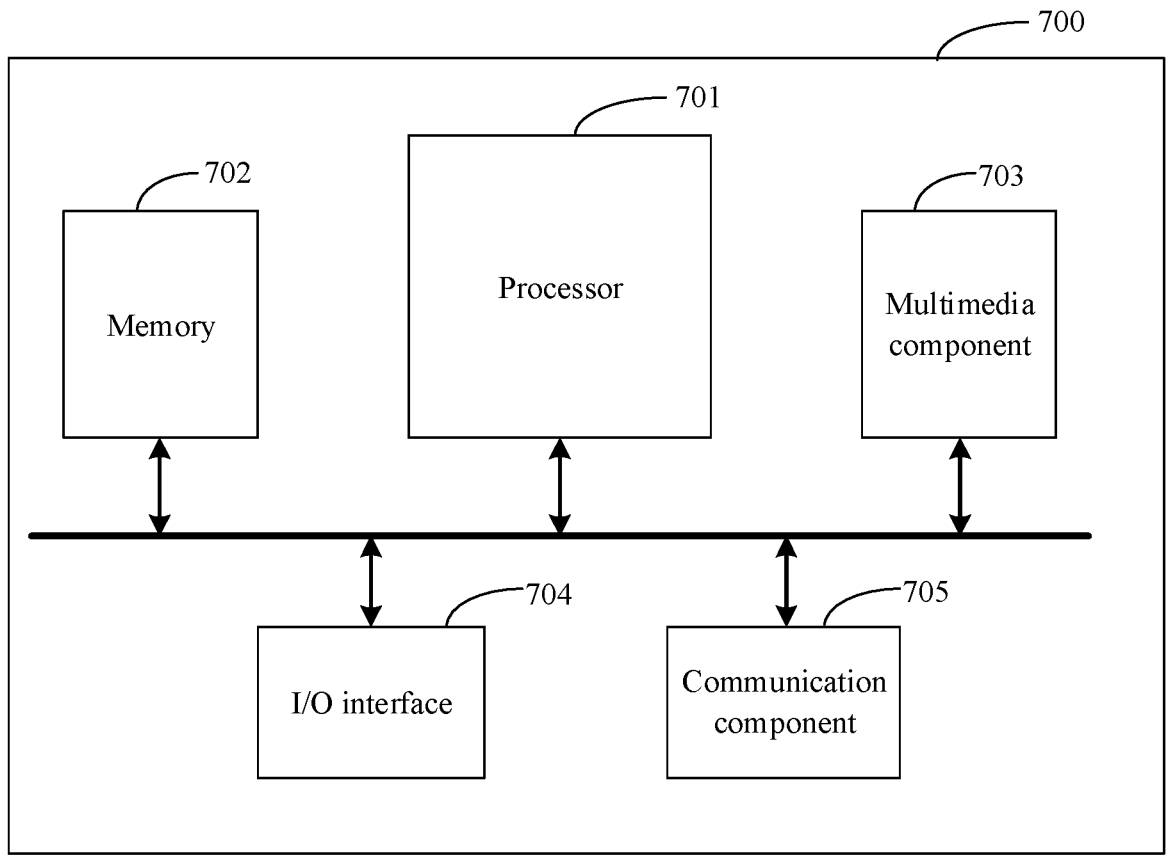
FIG. 7 is a block diagram of an electronic device according to an exemplary example.

FIG. 7 is a block diagram of an electronic device 700 according to an exemplary example. As shown in FIG. 7, the electronic device 700 may include a processor 701 and a memory 702. The electronic device 700 may also include one or more of a multimedia component 703, an input/output (I/O) interface 704 and a communication component 705.

The processor 701 is configured to control the overall operation of the electronic device 700 to complete all or part of the steps in the action learning method described above. The memory 702 is used to store various types of data to support operation at the electronic device 700, the data may include, for example, instructions for any of the applications or methods operating on the electronic device 700 as well as application-related data such as contact data, sent and received messages, pictures, audio, video, and so forth. The memory 702 can be implemented by any type of volatile or non-volatile storage device, or a combination thereof, for example Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), a magnetic memory, a flash memory, a magnetic disk, or an optical disk. The multimedia component 703 may include a screen and an audio component. The screen may for example be a touch screen, the audio component is configured to output and/or input audio signals. For example, the audio component may include one microphone for receiving an external audio signal. Received audio signals may be further stored in the memory 702 or transmitted through the communication component 705. The audio component further includes at least one speaker for outputting audio signals. The I/O interface 704 provides an interface between the processor 701 and other interface modules, which may be a keyboard, a mouse, buttons, and the like. These buttons may be virtual buttons or physical buttons. The communication component 705 is used for wired or wireless communication between the electronic device 700 and other devices. Wireless communication includes Wi-Fi, Bluetooth, Near Field Communication (NFC), 2G, 3G, 4G, NB-IOT, eMTC, or other 5G, etc., or a combination of one or more thereof, is not intended to be limiting herein. Accordingly, the corresponding communication component 705 may include a Wi-Fi module, a Bluetooth module, an NFC module, and so on.

In an exemplary example, the electronic device 700 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic elements for performing the action learning method described above.

In another exemplary example, also provided is a computer readable storage medium including program instructions that, when executed by a processor, implement the steps of the action learning method described above. For example, the computer readable storage medium may be the memory 702 including program instructions described above, and the program instructions are executable by the processor 701 of the electronic device 700 to perform the action learning method described above.

Figure 8:
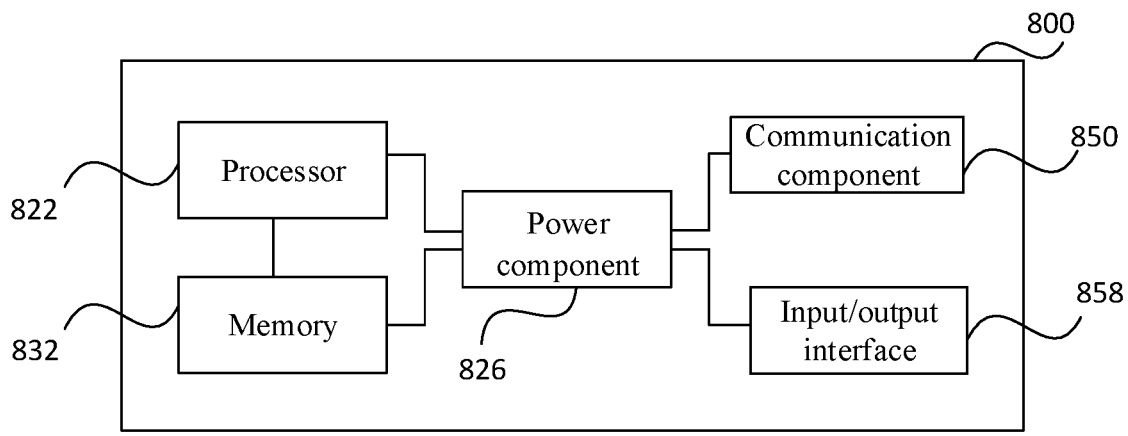
FIG. 8 is a block diagram of an electronic device according to an exemplary example.

FIG. 8 is a block diagram of an electronic device 800 according to an exemplary example. For example, the electronic device 800 may be provided as a server. Referring to FIG. 8, the electronic device 800 includes a processor 822, which may be one or more in number, and a memory 832 for storing a computer program executable by the processor 822. The computer program stored in the memory 832 may include one or more modules, each of which corresponds to a set of instructions. Further, the processor 822 may be configured to execute the computer program to perform the action learning method described above.

Additionally, the electronic device 800 may further include a power component 826, which may be configured to perform power management of the electronic device 800, and a communication component 850, which may be configured to realize communication, such as wired or wireless communication, of the electronic device 800. The electronic device 800 may further include an input/output (I/O) interface 858. The electronic device 800 may operate based on an operating system, such as Windows Server™, Mac OS X™, Unix™ and Linux™, stored in the memory 832.

In another exemplary example, also provided is a computer readable storage medium including program instructions that, when executed by a processor, implement the steps of the action learning method described above. For example, the computer readable storage medium may be the memory 832 including program instructions described above, and the program instructions are executable by the processor 822 of the electronic device 800 to perform the action learning method described above.

In another exemplary example, also provided is a computer program product including a computer program executable by a programmable apparatus, and the computer program has code portions for performing the action learning method described above when executed by the programmable apparatus.

Preferred examples of the disclosure have been described above in detail with reference to the accompanying drawings, but the disclosure is not limited to specific details in the above-described examples, and many simple modifications may be made to the technical solutions of the disclosure within the technical idea of the disclosure, all of which are within the scope of protection of the disclosure.

It is furthermore to be noted that various features described in the above detailed description may be combined in any suitable manner without conflict. In order to avoid unnecessary repetition, the disclosure does not further describe the various possible combinations.

In addition, any combination between the various different implementations of the disclosure may also be made, and should likewise be considered as disclosed by the disclosure as long as it does not depart from the idea of the disclosure.

What is claimed is:

1. An action learning method, comprising:
   acquiring human body moving image data;
   determining three-dimensional human body pose action data corresponding to the human body moving image data, wherein the three-dimensional human body pose action data comprising a plurality of three-dimensional human body poses arranged in a chronological order of actions;
   matching the three-dimensional human body pose action data with atomic actions in a robot atomic action library to determine robot action sequence data corresponding to the human body moving image data, wherein the robot action sequence data comprises a plurality of robot sub-actions comprising the atomic actions and/or mapped actions obtained by mapping the three-dimensional human body pose action data,
   performing action continuity stitching on all robot sub-actions in the robot action sequence data; and
   determining a continuous action learned by a robot from the robot action sequence data subjected to the action continuity stitching;
   wherein performing action continuity stitching on all robot sub-actions in the robot action sequence data comprises:
   performing avoidance processing on self-collision anomaly occurring in the robot action sequence data obtained by the sequential stitching of the robot sub-actions.

2. The method according to claim 1, wherein determining three-dimensional human body pose action data corresponding to the human body moving image data comprises:
   determining two-dimensional human body motion keypoints corresponding to all images in the human body moving image data respectively; and
   determining the three-dimensional human body pose action data from two-dimensional keypoint sequence data comprising the two-dimensional human body motion keypoints corresponding to the images respectively.

3. The method according to claim 1, wherein matching the three-dimensional human body pose action data with atomic actions in a robot atomic action library to determine robot action sequence data corresponding to the human body moving image data comprises:
   matching a plurality of human body sub-actions comprised in the three-dimensional human body pose action data in the chronological order of actions sequentially, and determining robot sub-actions corresponding to the human body sub-actions based on the similarity of all atomic actions in the robot atomic action library to the human body sub-actions, wherein the human body sub-action comprises one or more of the three-dimensional human body poses; and determining the robot action sequence data comprising the robot sub-actions in the chronological order of actions.

4. The method according to claim 3, wherein determining robot sub-actions corresponding to the human body sub-actions based on the similarity of all atomic actions in the robot atomic action library to the human body sub-actions comprises:

taking the atomic actions with the similarity to the human body sub-action being higher than a similarity threshold as candidate atomic actions under the condition that the human body sub-action is not the first human body sub-action comprised in the three-dimensional human body pose action data and two or more atomic actions with the similarity to the human body sub-action being higher than the similarity threshold exist;

calculating a continuity matching degree between the candidate atomic actions and a robot sub-action corresponding to the previous human body sub-action sequentially; and determining an atomic action matching the human body sub-action among the candidate atomic actions as the robot sub-action corresponding to the human body sub-action based on the similarity and the continuity matching degree.

5. The method according to claim 4, wherein determining robot sub-actions corresponding to the human body sub-actions based on the similarity of all atomic actions in the robot atomic action library to the human body sub-actions further comprises:

mapping the human body sub-action to obtain a robot sub-action under the condition that no atomic action with the similarity to the human body sub-action being higher than the similarity threshold exists in the robot atomic action library.

6. The method according to claim 1, wherein performing action continuity stitching on all robot sub-actions in the robot action sequence data comprises:

performing smooth optimization on robot pose positions and robot motion velocities at joints between adjacent robot sub-actions.

7. The method according to claim 1, further comprising:

executing the robot action sequence data subjected to the action continuity stitching in a digital twin model of the robot and optimizing the robot action sequence data according to simulation data of the digital twin model;

determining a continuous action learned by a robot from the robot action sequence data subjected to the action continuity stitching comprises:

determining robot action sequence data optimized according to the simulation data of the digital twin model as a continuous action learned by the robot.

8. A non-transitory computer-readable storage medium storing a computer program which, when executed by a processor:

acquires human body moving image data;

determines three-dimensional human body pose action data corresponding to the human body moving image data, wherein the three-dimensional human body pose action data comprising a plurality of three-dimensional human body poses arranged in a chronological order of actions;

matches the three-dimensional human body pose action data with atomic actions in a robot atomic action library to determine robot action sequence data corresponding to the human body moving image data, wherein the robot action sequence data comprises a plurality of robot sub-actions comprising the atomic actions and/or mapped actions obtained by mapping the three-dimensional human body pose action data;

performs action continuity stitching on all robot sub-actions in the robot action sequence data; and determines a continuous action learned by a robot from the robot action sequence data subjected to the action continuity stitching;

wherein performing action continuity stitching on all robot sub-actions in the robot action sequence data comprises:

performing avoidance processing on self-collision anomaly occurring in the robot action sequence data obtained by the sequential stitching of the robot sub-actions.

9. An electronic device, comprising:

a memory storing a computer program; and a processor, configured to execute the computer program in the memory to: acquire human body moving image data;

determine three-dimensional human body pose action data corresponding to the human body moving image data, wherein the three-dimensional human body pose action data comprising a plurality of three-dimensional human body poses arranged in a chronological order of actions;

match the three-dimensional human body pose action data with atomic actions in a robot atomic action library to determine robot action sequence data corresponding to the human body moving image data, wherein the robot action sequence data comprises a plurality of robot sub-actions comprising the atomic actions and/or mapped actions obtained by mapping the three-dimensional human body pose action data;

perform action continuity stitching on all robot sub-actions in the robot action sequence data; and determine a continuous action learned by a robot from the robot action sequence data subjected to the action continuity stitching;

wherein the processor is further configured to:

perform avoidance processing on self-collision anomaly occurring in the robot action sequence data obtained by the sequential stitching of the robot sub-actions.

10. The electronic device according to claim 9, the processor is further configured to:

determine two-dimensional human body motion keypoints corresponding to all images in the human body moving image data respectively; and determine the three-dimensional human body pose action data from two-dimensional keypoint sequence data comprising the two-dimensional human body motion keypoints corresponding to the images respectively.

11. The electronic device according to claim 9, the processor is further configured to:

match a plurality of human body sub-actions comprised in the three-dimensional human body pose action data in the chronological order of actions sequentially, and determine robot sub-actions corresponding to the human body sub-actions based on the similarity of all atomic actions in the robot atomic action library to the human body sub-actions, wherein the human body sub-action comprises one or more of the three-dimensional human body poses; and determine the robot action sequence data comprising the robot sub-actions in the chronological order of actions.

12. The electronic device according to claim 11, the processor is further configured to:

take the atomic actions with the similarity to the human body sub-action being higher than a similarity threshold as candidate atomic actions under the condition that the human body sub-action is not the first human body sub-action comprised in the three-dimensional human body pose action data and two or more atomic actions with the similarity to the human body sub-action being higher than the similarity threshold exist;

calculate a continuity matching degree between the candidate atomic actions and a robot sub-action corresponding to the previous human body sub-action sequentially; and determine an atomic action matching the human body sub-action among the candidate atomic actions as the robot sub-action corresponding to the human body sub-action based on the similarity and the continuity matching degree.

13. The electronic device according to claim 12, the processor is further configured to:

map the human body sub-action to obtain a robot sub-action under the condition that no atomic action with the similarity to the human body sub-action being higher than the similarity threshold exists in the robot atomic action library.

14. The electronic device according to claim 9, the processor is further configured to:

perform smooth optimization on robot pose positions and robot motion velocities at joints between adjacent robot sub-actions.

15. The electronic device according to claim 9, the processor is further configured to:

execute the robot action sequence data subjected to the action continuity stitching in a digital twin model of the robot and optimizing the robot action sequence data according to simulation data of the digital twin model;

determine robot action sequence data optimized according to the simulation data of the digital twin model as a continuous action learned by the robot.

* * * * *